(12) United States Patent
Lei et al.

(10) Patent No.: US 11,463,566 B2
(45) Date of Patent: Oct. 4, 2022

(54) CAMERA CONTROL METHOD AND MOBILE TERMINAL

(71) Applicant: VIVO MOBILE COMMUNICATION CO., LTD., Guangdong (CN)

(72) Inventors: Naice Lei, Chang'an Dongguan (CN); Guohong Liu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 261 days.

(21) Appl. No.: 16/763,911

(22) PCT Filed: Nov. 13, 2018

(86) PCT No.: PCT/CN2018/115219
§ 371 (c)(1),
(2) Date: May 13, 2020

(87) PCT Pub. No.: WO2019/096123
PCT Pub. Date: May 23, 2019

(65) Prior Publication Data
US 2021/0136188 A1 May 6, 2021

(30) Foreign Application Priority Data
Nov. 14, 2017 (CN) .......................... 201711122960.5

(51) Int. Cl.
*H04N 5/225* (2006.01)
*H04M 1/02* (2006.01)

(52) U.S. Cl.
CPC ........ *H04M 1/0264* (2013.01); *H04N 5/2251* (2013.01); *H04N 5/2257* (2013.01); *H04M 2250/52* (2013.01)

(58) Field of Classification Search
CPC .............................. H04N 5/227; H04M 1/0264
(Continued)

(56) References Cited

U.S. PATENT DOCUMENTS

| 2005/0014527 A1 | 1/2005 | Chambers et al. |
| 2015/0189175 A1 | 7/2015 | Fan et al. |

(Continued)

FOREIGN PATENT DOCUMENTS

| CN | 2807637 Y | 8/2006 |
| CN | 201657118 U | 11/2010 |

(Continued)

OTHER PUBLICATIONS

CN Office Action in Application No. 201711122960.5 dated May 7, 2019.
(Continued)

*Primary Examiner* — Anthony J Daniels
(74) *Attorney, Agent, or Firm* — Maschoff Brennan

(57) ABSTRACT

The present disclosure provides a camera control method and a mobile terminal. The method is applied to a mobile terminal. The mobile terminal includes an accommodating space for accommodating a retractable camera assembly. The retractable camera assembly includes a camera and a motor, the motor is connected to the camera via an elastic transmission structure for driving the camera to move. The method includes: identifying a current state of the camera when a triggering operation against the camera is detected, where the triggering operation includes a pressing operation or a stretching operation, and the state of the camera includes a retracted state, an extended state, a retracting process or an extending process; controlling movement of the camera according to the triggering operation and the current state of the camera.

15 Claims, 8 Drawing Sheets

(58) Field of Classification Search
USPC .......................................................... 348/376
See application file for complete search history.

(56) References Cited

U.S. PATENT DOCUMENTS

| | | | |
|---|---|---|---|
| 2015/0281525 A1 | 10/2015 | Thakur | |
| 2017/0085781 A1 | 3/2017 | Fu et al. | |
| 2018/0091716 A1* | 3/2018 | Brand | .................. H04N 5/2257 |
| 2019/0141170 A1* | 5/2019 | Zeng | .................. H04M 1/0237 |

FOREIGN PATENT DOCUMENTS

| | | |
|---|---|---|
| CN | 203722706 U | 7/2014 |
| CN | 104243826 A | 12/2014 |
| CN | 105208269 A | 12/2015 |
| CN | 105430131 A | 3/2016 |
| CN | 205792925 U | 12/2016 |
| CN | 106331450 A | 1/2017 |
| CN | 106453705 A | 2/2017 |
| CN | 206433032 U | 8/2017 |
| CN | 107819907 A | 3/2018 |
| EP | 2 131 257 A1 | 12/2009 |
| JP | H10248029 A | 9/1998 |
| KR | 1020060097245 A * | 9/2006 ............. G05B 24/00 |

OTHER PUBLICATIONS

Written Opinion and International Search Report in Application No. PCT/CN2018/115219 dated May 28, 2020.
CN Search Report in Application No. 201711122960.5 dated Nov. 16, 2018.
European Search Report issued in corresponding application 18879665.0, dated Dec. 21, 2020.

* cited by examiner

CAMERA CONTROL METHOD AND MOBILE TERMINAL

CROSS-REFERENCE TO RELATED APPLICATION

This application is the U.S. national phase of PCT Application PCT/CN2018/115219 filed on Nov. 13, 2018, which claims the benefit and priority of Chinese Application No. 201711122960.5, filed on Nov. 14, 2017, the disclosures of which are incorporated in their entirety by reference herein.

TECHNICAL FIELD

The present disclosure relates to the field of communication technologies, and in particular to a camera control method and a mobile terminal.

BACKGROUND

With the development of mobile terminals, taking pictures with mobile terminals is becoming more and more common. In order to realize a self-shooting function, the mobile terminal is generally provided with a front-facing camera, and a camera shooting window needs to be reserved in an area of a display screen of the mobile terminal. Thus, the front-facing camera will occupy a display area of the display screen. Currently, in order to solve the problem that the front-facing camera occupies the display area, a retractable camera assembly may be provided for one mobile terminal. The retractable camera assembly may include a camera and a motor for driving the camera to move. The camera of the retractable camera assembly may extend out of an accommodating space of the mobile terminal when shooting is required, and retract into the accommodating space of the mobile terminal when shooting is not required.

However, in the related art, generally, a control signal can only be transmitted to the motor in the retractable camera assembly through the mobile terminal to control rotation of the motor, to drive the camera in the telescopic camera module to extend and retract. Thus, the control mode of the camera in the retractable camera module is relatively simple.

SUMMARY

According to a first aspect, one embodiment of the present disclosure provides a camera control method applied to a mobile terminal. The mobile terminal includes an accommodating space for accommodating a retractable camera assembly, the retractable camera assembly includes a camera and a motor, the motor is connected to the camera via an elastic transmission structure for driving the camera to move. The method includes:

identifying a current state of the camera when a triggering operation against the camera is detected; wherein the triggering operation includes a pressing operation or a stretching operation, and the state of the camera includes a retracted state, an extended state, a retracting process or an extending process;

controlling movement of the camera according to the triggering operation and the current state of the camera.

In a second aspect, one embodiment of the present disclosure further provides a mobile terminal. The mobile terminal includes an accommodating space; and a retractable camera assembly accommodated in the accommodating space. The retractable camera assembly includes a camera and a motor, the motor is connected to the camera via an elastic transmission structure for driving the camera to move. The mobile terminal further includes:

an identification module used to, when a triggering operation against the camera is detected, identify a current state of the camera; wherein the triggering operation includes a pressing operation or a stretching operation, and the state of the camera includes a retracted state, an extended state, a retracting process or an extending process;

a first control module used to control movement of the camera according to the triggering operation and the current state of the camera.

In a third aspect, one embodiment of the present disclosure further provides a mobile terminal including a processor, a memory, and a program stored on the memory and executable on the processor. The program is executed by the processor to implement steps of the above camera control method.

In a fourth aspect, one embodiment of the present disclosure further provides a computer-readable storage medium including a program stored thereon. The program is executed by a processor to implement steps of the above camera control method.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

The technical solution of embodiments of the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Embodiments of the present disclosure provide a camera control method and a mobile terminal, which can solve the problem in the related art that the control mode of the camera in the retractable camera assembly is relatively single.

In order to solve the above technical problem, the present disclosure is realized with a camera control method applied to a mobile terminal. The mobile terminal is provided with an accommodating space for accommodating a retractable camera assembly. The retractable camera assembly includes a camera and a motor. The motor is connected to the camera via an elastic transmission structure for driving the camera to move. The method includes: when a triggering operation against the camera is detected, identifying a current state of the camera, where the triggering operation includes a pressing operation or a stretching operation, and the state of the camera includes a retracted state, an extended state, a retracting process or an extending process; controlling movement of the camera according to the triggering operation and the current state of the camera.

In this embodiment of the present disclosure, the movement of the camera can be controlled according to the triggering operation of users against the camera and a target state in which the camera is currently located, thereby enriching the control mode of the camera of the retractable camera assembly and increasing the interaction manner between the user and the camera.

One embodiment of the present disclosure provides a camera control method that is applied to a mobile terminal. The mobile terminal is provided with an accommodating space for accommodating a retractable camera assembly. The retractable camera assembly includes a camera and a motor. The motor is connected to the camera via an elastic transmission structure for driving the camera to move. Specifically, under the drive of the motor, the camera may extend out of the accommodating space of the mobile terminal or may be retracted back into the accommodating space of the mobile terminal. For example, referring to FIG. 1 and FIG. 2, the camera 10 is retracted in the accommodating space of the mobile terminal 1 when the camera 10 of the retractable camera assembly is not required for shooting, and the camera 10 extends out of the accommodating space of the mobile terminal 1 when the camera 10 of the retractable camera assembly is required for shooting, thereby preventing the camera 10 from occupying the display area of a display screen 11 of the mobile terminal 1.

Figure 3:
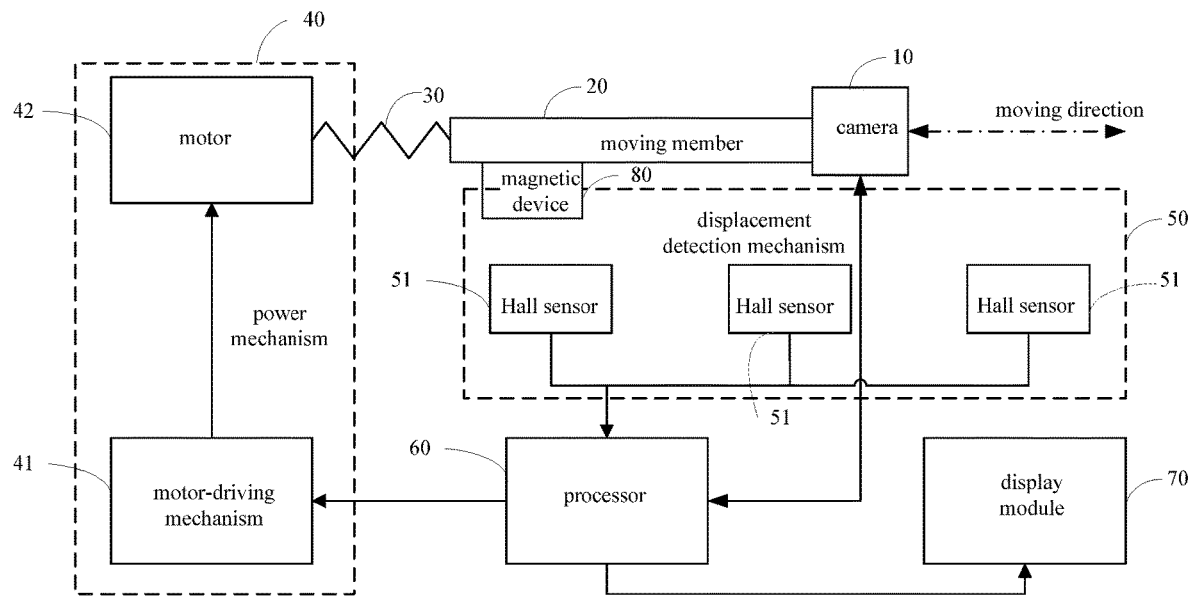
FIG. 3 is a schematic diagram of a hardware environment in which a camera control method according to an embodiment of the present disclosure may be applied.

Referring to FIG. 3, FIG. 3 is a schematic diagram of a hardware environment in which a camera control method according to an embodiment of the present disclosure may be applied. As shown in FIG. 3, the hardware environment includes a camera 10, a moving member 20, an elastic transmission mechanism 30, a power mechanism 40, a displacement detection mechanism 50, a processor 60, a display module 70 and a magnetic device 80. The camera 10 may be connected to the power mechanism 40 through the moving member 20 and the elastic transmission mechanism 30. The power mechanism 40 includes a motor-driving mechanism 41 and a motor 42. The motor-driving mechanism 41 is used to drive the motor to rotate so as to control movement of the camera 10. The elastic transmission mechanism 30 may be a spring. Optionally, a certain preload may be applied to the elastic transmission mechanism 30. The preload may be reasonably set according to actual conditions. For example, the preload may be greater than a driving force of the motor. The moving member 20 is provided with the magnetic device 80. The displacement detection mechanism 50 may determine displacement of the camera 10 by detecting displacement of the magnetic device 80. The displacement detection mechanism 50 may include one or at least two displacement sensors. The displacement sensors shown in FIG. 3 may be Hall sensors 51. The processor 60 is connected to the camera 10, the power mechanism 40, the displacement detection mechanism 50 and the display module 70, respectively.

It will be appreciated that positional relationship between various components of the hardware environment shown in FIG. 3 is merely illustrative, and that the hardware environment shown in FIG. 3 may further include other hardware modules as required, which is not limited in the embodiments of the present disclosure.

In one embodiment of the present disclosure, when it is necessary to extend the camera 10 out of the accommodating space of the mobile terminal or to retract the camera 10 into the accommodating space of the mobile terminal, the processor 60 may transmit a motor control signal to the motor-driving mechanism 41. According to the motor control signal, the motor-driving mechanism 41 drives the motor 42 to rotate, thereby moving the elastic transmission mechanism 30 and the moving member 20 and then further pushing the camera 10 to move in a direction of extending out the accommodating space of the mobile terminal or to move in a direction of retracting the camera 10 back into the accommodating space of the mobile terminal. At this point, the displacement detection mechanism 50 may detect a displacement amount of the magnetic device 80 in real time and feed back the displacement amount to the processor 60. The processor 60 may obtain a displacement amount of the camera 10 according to corresponding relationship between the displacement amount of the magnetic device 80 and the displacement amount of the camera 10. It is understood that the displacement detection mechanism 50 may also directly detect the displacement amount of the camera 10 and feed back the displacement amount to the processor 60. The processor 60 may control the rotation of the motor 42 in accordance with the amount of displacement of the camera 10.

In one embodiment of the present disclosure, the camera 10 may also receive an external force, for example, an external force such as a pressing operation or a stretching operation of a user, and may be moved by the external force.

Figure 4:
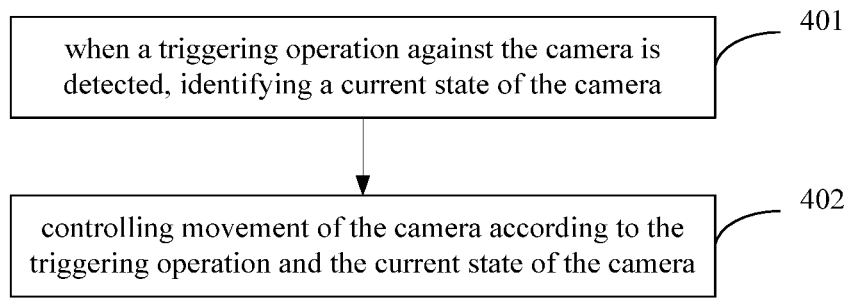
FIG. 4 is a flowchart of a camera control method according to an embodiment of the present disclosure.

Referring to FIG. 4, FIG. 4 is a flowchart of a camera control method according to an embodiment of the present disclosure. The camera control method is applied to a mobile terminal. The mobile terminal is provided with an accommodating space for accommodating a retractable camera assembly. The retractable camera assembly includes a camera and a motor. The motor is connected to the camera via an elastic transmission structure for driving the camera to move. As shown in FIG. 4, the camera control method includes the following steps 401 and 402.

Step 401: when a triggering operation against the camera is detected, identifying a current state of the camera, where the triggering operation includes a pressing operation or a stretching operation, and the state of the camera includes a retracted state, an extended state, a retracting process or an extending process.

In one embodiment of the present disclosure, the retractable camera assembly may include a camera, an elastic transmission mechanism, a motor, and the like. For example, referring to FIG. 3, the retractable camera assembly includes a camera 10, a moving member 20, an elastic transmission mechanism 30, a power mechanism 40 and a displacement detection mechanism 50. The power mechanism 40 includes a motor-driving mechanism 41 and a motor 42. Optionally, the elastic transmission structure may be a spring.

The above retractable camera assembly is provided in the accommodating space of the mobile terminal. A position of the accommodating space may be reasonably set according to actual requirements. For example, referring to FIG. 1, the accommodating space may be located in a top of the mobile terminal. Specifically, for example, referring to FIG. 2, the camera of the retractable camera assembly may extend out of the accommodating space of the mobile terminal when shooting is required. For example, referring to FIG. 1, the camera of the retractable camera assembly may be retracted back into the accommodating space of the mobile terminal when shooting is not required.

In one embodiment of the present disclosure, the camera may receive an external force (e.g., a pressing operation or a stretching operation of a user) and move under the action of the external force. Optionally, in one embodiment of the present disclosure, a pressure sensor may be provided in the camera and then whether there is a triggering operation against the camera may be detected by the pressure sensor; or, an displacement amount of the camera is detected and then whether there is a triggering operation against the camera may be detected according to the displacement amount of the camera. The triggering operation may include a pressing operation or a stretching operation. The stretching operation may refer to pulling the camera in a direction in which the camera extends out of the accommodating space.

Figure 1:
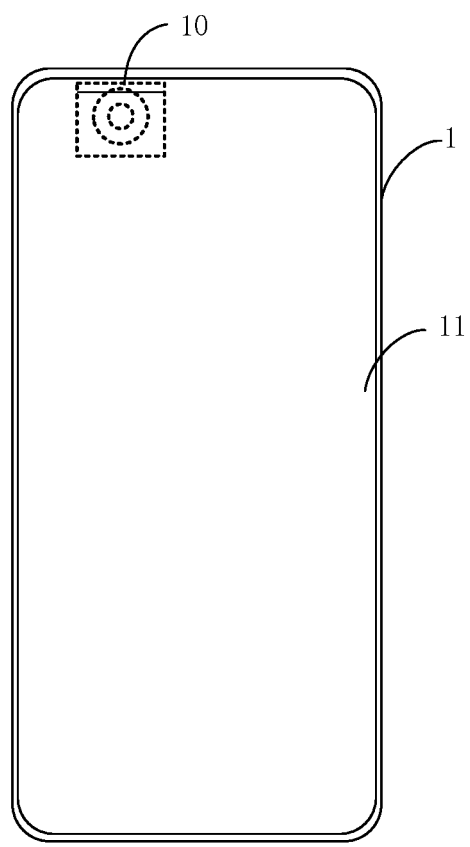
FIG. 1 is a schematic diagram of a camera in a retracted state according to an embodiment of the present disclosure.
Figure 2:
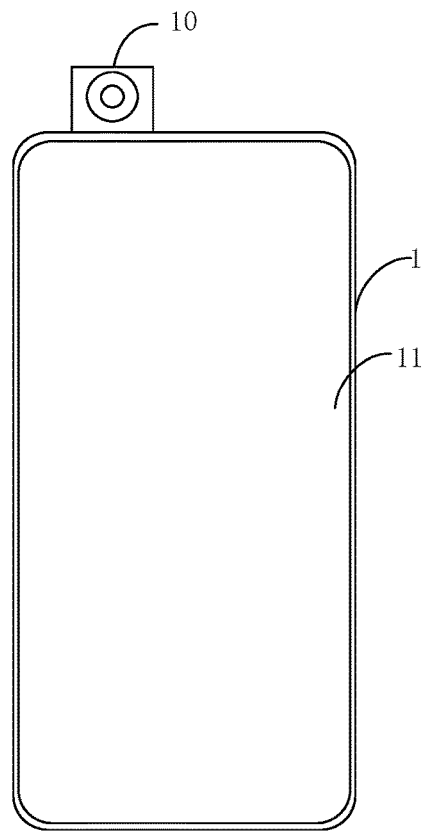
FIG. 2 is a schematic diagram of a camera in an extended state according to an embodiment of the present disclosure.

In one embodiment of the present disclosure, the retracted state means that the camera is located in the accommodating space of the mobile terminal. Referring to FIG. 1, the extended state means that the camera extends out of the accommodating space of the mobile terminal and is located outside the accommodating space. Referring to FIG. 2, the retracting process refers to a process in which the camera is retracted back into the accommodating space from an outside of the accommodating space, and the extending process refers to a process in which the camera extends out of the accommodating space to the outside of the accommodating space.

Step 402: controlling movement of the camera according to the triggering operation and the current state of the camera.

In this embodiment of the present disclosure, the movement of the camera can be controlled according to the triggering operation of the user against the camera and the current state of the camera. For example, when the triggering operation against the camera is identified, if the camera is in a retracted state, the motor can be activated to extend the camera out of the accommodating space and start the camera to enter the shooting mode. When the triggering operation against the camera is identified, if the camera is in the extended state, the motor may be activated to retract the camera into the accommodating space and turn off the camera. In this way, the interaction mode between the user and the camera can be increased, and the control mode of the camera can be enriched.

In one embodiment of the present disclosure, the mobile terminal may be a mobile phone, a Tablet Personal Computer, a Laptop Computer, a Personal Digital Assistant (PDA), a Wearable Device, or the like.

In the camera control method according to an embodiment of the present disclosure, when the triggering operation against the camera is detected, the current state of the camera is identified. The triggering operation includes a pressing operation or a stretching operation, and the state of the camera includes a retracted state, an extended state, a retracting process or an extending process. The movement of the camera is controlled according to the triggering operation and the current state of the camera. According to the triggering operation of the user against the camera and the target state in which the camera is currently located, the movement of the camera is controlled, thereby enriching the control mode of the camera of the retractable camera assembly and increasing the interaction manner between the user and the camera.

Figure 5:
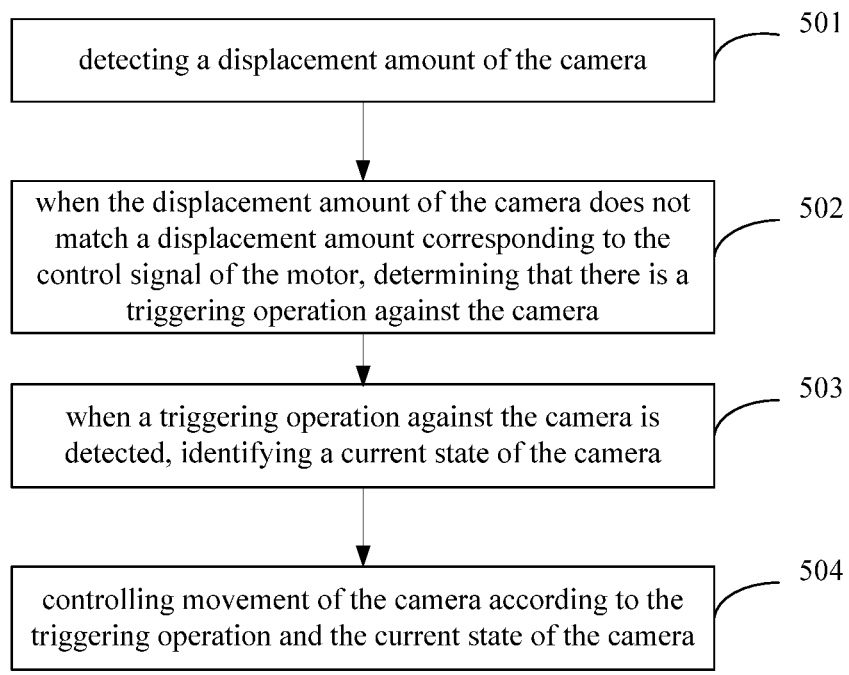
FIG. 5 is a flowchart of a camera control method according to another embodiment of the present disclosure.

Referring to FIG. 5, FIG. 5 is a flowchart of a camera control method according to another embodiment of the present disclosure. This embodiment of the present disclosure differs from the previous embodiment in that it further defines how to detect whether there is a triggering operation against the camera. In this embodiment, before the identifying a current state of the camera when a triggering operation against the camera is detected, the method further includes: detecting an displacement amount of the camera; when the displacement amount of the camera does not match a displacement amount corresponding to the control signal of the motor, determining that there is a triggering operation against the camera.

As shown in FIG. 5, the camera control method provided in this embodiment of the present disclosure includes the following steps 501 to 504.

Step 501: detecting a displacement amount of the camera.

In one embodiment of the present disclosure, the displacement amount of the camera can be detected in real time by the displacement detection mechanism.

Step 502: when the displacement amount of the camera does not match a displacement amount corresponding to the control signal of the motor, determining that there is a triggering operation against the camera.

In this embodiment of the present disclosure, within a load range of the motor, there is a one-to-one correspondence between the control signal used for controlling the motor and the displacement amount. Optionally, the motor may be a stepping motor. The above detected displacement amount of the camera not matching the displacement amount corresponding to the control signal of the motor may mean that the detected displacement amount of the camera is not equal to the displacement amount corresponding to the control signal of the motor, or may mean that a difference between the detected displacement amount of the camera and the displacement amount corresponding to the control signal of the motor is greater than a preset difference. The preset difference may be reasonably set according to actual conditions.

Specifically, if the displacement amount of the camera does not match the displacement amount corresponding to the control signal of the motor, it indicates that an external force is applied to the camera, that is, there is a triggering operation against the camera, and then step 503 is executed. If the displacement amount of the camera matches the displacement amount corresponding to the control signal of the motor, the above step 501 may be returned to be executed.

Optionally, in order to improve the accuracy of the detection result, if the displacement amount of the camera does not match the displacement amount corresponding to the control signal of the motor, determining that there is a triggering operation against the camera, includes: when the displacement amount of the camera does not match the displacement amount corresponding to the control signal of the motor, determining whether a moving speed of the camera is 0; if the moving speed of the camera is not 0, determining whether a moving direction of the camera is the same as a moving direction corresponding to a target rotating direction of the motor; if the moving direction of the camera is different from the moving direction corresponding to the target rotating direction of the motor, determining that there is a triggering operation against the camera.

In practice, when the motor is abnormal, the displacement amount of the camera may not match the displacement amount corresponding to the control signal of the motor. Thus, in this embodiment, when the displacement amount of the camera does not match the displacement amount corresponding to the control signal of the motor, whether the moving speed of the camera is 0 is determined. When it is determined that the moving speed of the camera is not 0, it indicates that the camera is moving. At this time, it can be further determined whether the moving direction of the camera is the same as the moving direction corresponding to the rotating direction of the motor, where different rotating directions of the motor correspond to different moving directions. For example, when the motor rotates in the forward direction, the camera moves in the direction of extending out of the accommodating space; when the motor rotates in a reverse direction, the camera moves in the direction of retracting back into the accommodating space.

Specifically, when it is determined that the moving direction of the camera is different from the moving direction corresponding to the rotating direction of the motor, it indicates that there is an external force acting on the camera, that is, there is a triggering operation against the camera, thereby reducing misjudgment due to abnormality of the motor.

Optionally, when the moving direction of the camera is different from the moving direction corresponding to the target rotating direction of the motor, determining that there is a triggering operation against the camera includes: when the moving direction corresponding to the rotating direction of the motor is a direction of extending out of the accommodating space, if the moving direction of the camera is different from the moving direction corresponding to the target rotating direction of the motor, determining that there is a pressing operation for the camera; when the moving direction corresponding to the rotating direction of the motor is the direction of retracting back into the accommodating space, if the moving direction of the camera is different from the moving direction corresponding to the target rotating direction of the motor, determining that there is a stretching operation for the camera.

In one embodiment of the present disclosure, when the moving direction of the camera is different from the moving direction corresponding to the rotating direction of the motor, the type of the triggering operation against the camera can be further determined in combination with the moving direction corresponding to the rotating direction of the motor. That is, when the moving direction corresponding to the rotating direction of the motor is the direction of extending out of the accommodating space, if the moving direction of the camera is different from the moving direction corresponding to the target rotating direction of the motor, it can be determined that the pressing operation for the camera exists. When the moving direction corresponding to the rotating direction of the motor is the direction of retracting back into the accommodating space, if the moving direction of the camera is different from the moving direction corresponding to the target rotating direction of the motor, it can be determined that the stretching operation for the camera exists.

In the embodiment of the present disclosure, by identifying the type of the triggering operation against the camera, the camera can be controlled according to the type of the triggering operation, so that the control of the camera is more accurate.

Optionally, the method further includes: when the moving direction of the camera is the same as the moving direction corresponding to the target rotating direction of the motor, controlling the motor to continue to rotate in the target rotating direction so as to drive the camera to move; detecting whether the camera moves to a preset position; when the camera is not moved to the preset position, returning to the step of detecting the displacement amount of the camera.

In practical application, when the moving direction of the camera is the same as the moving direction corresponding to the target rotating direction of the motor, it is possible that the displacement amount of the camera does not match the displacement amount corresponding to the control signal of the motor due to the abnormality of the motor. In this case, the rotation of the motor can be compensated, that is, a control signal is continuously transmitted to the motor, so as to control the motor to continue to rotate according to the previous rotating direction (that is, the target rotating direction). Whether the camera moves to the preset position is detected. The preset position may be a position in which the camera is retracted back into the accommodating space, or may be a position in which the camera extends out of the accommodating space. Specifically, when it is detected that the camera has not moved to the preset position, the above step 201 may be returned to be executed, otherwise, the process can be ended.

In the embodiment of the present disclosure, when the moving direction of the camera is the same as the moving direction corresponding to the target rotating direction of the motor, the motor is controlled to continue to rotate in the target rotating direction so as to drive the camera to move, thereby reducing misjudgment caused by abnormality of the motor.

Optionally, the method further includes: increasing the number of times the moving speed of the camera is 0 by 1 if the moving speed of the camera is 0; if the number of times the moving speed of the camera is 0 is greater than a preset threshold value, controlling the motor to stop rotating, clearing the number of times the moving speed of the camera is 0 and outputting prompt information; if the number of times the moving speed of the camera is 0 is not greater than the preset threshold value, controlling the motor to continue to rotate in the target rotating direction, and returning to the step of detecting the displacement amount of the camera.

In practical application, when the moving speed of the camera is 0, it may be possible that the displacement amount of the camera does not match the displacement amount corresponding to the control signal of the motor due to the abnormality of the motor. In this case, the number of times the camera moves at the speed of 0 may be increased by 1, and it may be determined whether the number of times the camera moves at the speed of 0 is greater than the preset threshold value. The preset threshold value may be set reasonably according to actual conditions, for example, twice or three times. When it is determined that the number of times the camera moves at the speed of 0 is greater than the preset threshold value, in order to prevent the motor from always working or burning out, the motor may be controlled to stop rotating, and prompt information may be output, For example, to prompt the user to retract the camera back into the accommodating space. When the number of times the camera moves at the speed of 0 is not greater than the preset threshold value, the motor may be controlled to continue to rotate in the target rotating direction, and the above step 501 may be returned to be executed.

In one embodiment of the present disclosure, when the moving speed of the camera is 0, it is further determined whether the number of times the moving speed of the camera is 0 is greater than the preset threshold value, and the motor is controlled according to a determination result, thereby reducing misjudgment caused by abnormality of the motor.

Step 503: when a triggering operation against the camera is detected, identifying a current state of the camera, where the triggering operation includes a pressing operation or a stretching operation, and the state of the camera includes a retracted state, an extended state, a retracting process, or an extending process.

This step is the same as the step 401, which will not be elaborated herein.

Step 504: controlling movement of the camera according to the triggering operation and the current state of the camera.

In this embodiment of the present disclosure, the movement of the camera can be controlled according to the triggering operation of the user against the camera and the current state of the camera. For example, when the triggering operation against the camera is identified, if the camera is in a retracted state, the motor can be activated to extend the camera out of the accommodating space and start the camera to enter the shooting mode. When the triggering operation against the camera is identified, if the camera is in the extended state, the motor may be activated to retract the camera into the accommodating space and turn off the camera. In this way, the interaction mode between the user and the camera can be increased, and the control mode of the camera can be enriched.

Optionally, in order to further enrich the control manner for the camera, the controlling movement of the camera according to the triggering operation and the current state of the camera includes:

when the triggering operation is a pressing operation and the current state of the camera is a retracted state, controlling the camera to move in a direction of extending out the accommodating space;

when the triggering operation is the pressing operation and the current state of the camera is an extended state, controlling the camera to move in a direction of retracting back into the accommodating space;

when the triggering operation is the pressing operation and the current state of the camera is an extending process, controlling the camera to move in the direction of retracting back into the accommodating space;

when the triggering operation is a stretching operation and the current state of the camera is a retracting process, controlling the camera to move in the direction of extending out the accommodating space.

In one embodiment of the present disclosure, the movement of the camera can be controlled according to the type of the triggering operation and the current state of the camera.

For example, when the pressing operation for the camera is identified, if the camera is in the retracted state, the motor may be activated to extend the camera out of the accommodating space, and the camera may be turned on to enter the shooting mode. When the pressing operation for the camera is identified, if the camera is in the extended state, the motor may be activated to retract the camera back into the accommodating space and the camera may be turned off. When the pressing operation for the camera is identified, if the camera is in the extending process, the motor can be controlled to rotate in a reverse direction to retract the camera back into the accommodating space. When the stretching operation for the camera is identified, if the camera is in the retracting process, the motor can be controlled to rotate in the reverse direction to extend the camera out of the accommodating space.

Optionally, when the pressing operation for the camera is identified, if the camera is in the retracting process, a retraction speed of the camera may be accelerated, or the motor may be controlled to rotate in a reverse direction to control the camera to extend out of the accommodating space. When the stretching operation for the camera is identified, if the camera is in the stretching process, a stretching speed of the camera may be accelerated, or the motor may be controlled to rotate in the reverse direction to control the camera to retract back into the accommodating space.

Optionally, when the camera is in the retracting process, if the motor is blocked by external force or foreign matters, the driving of the motor may be stopped to prevent the motor from operating all the time, and the user may be reminded to assist in retracting the camera back into the accommodating space.

It will be appreciated that different control modes may be configured according to different types of triggering operation and the current state of the camera, thereby further enriching the control modes of the camera and providing more human-machine interaction modes for the user.

According to the camera control method of the embodiment of the present disclosure, the displacement amount of the camera is detected; when the displacement amount of the camera does not match the displacement amount corresponding to the control signal of the motor, it is determined that there is a triggering operation against the camera. When the triggering operation against the camera is detected, the current state of the camera is identified. The triggering operation includes a pressing operation or a stretching operation, and the state of the camera includes the retracted state, the extended state, the retracting process or the extending. According to the triggering operation and the current state of the camera, the movement of the camera is controlled. The embodiments of the present disclosure can detect the triggering operation by means of displacement amount without adding additional sensors, thereby providing more human-machine interaction modes without increasing hardware costs.

Figure 6:
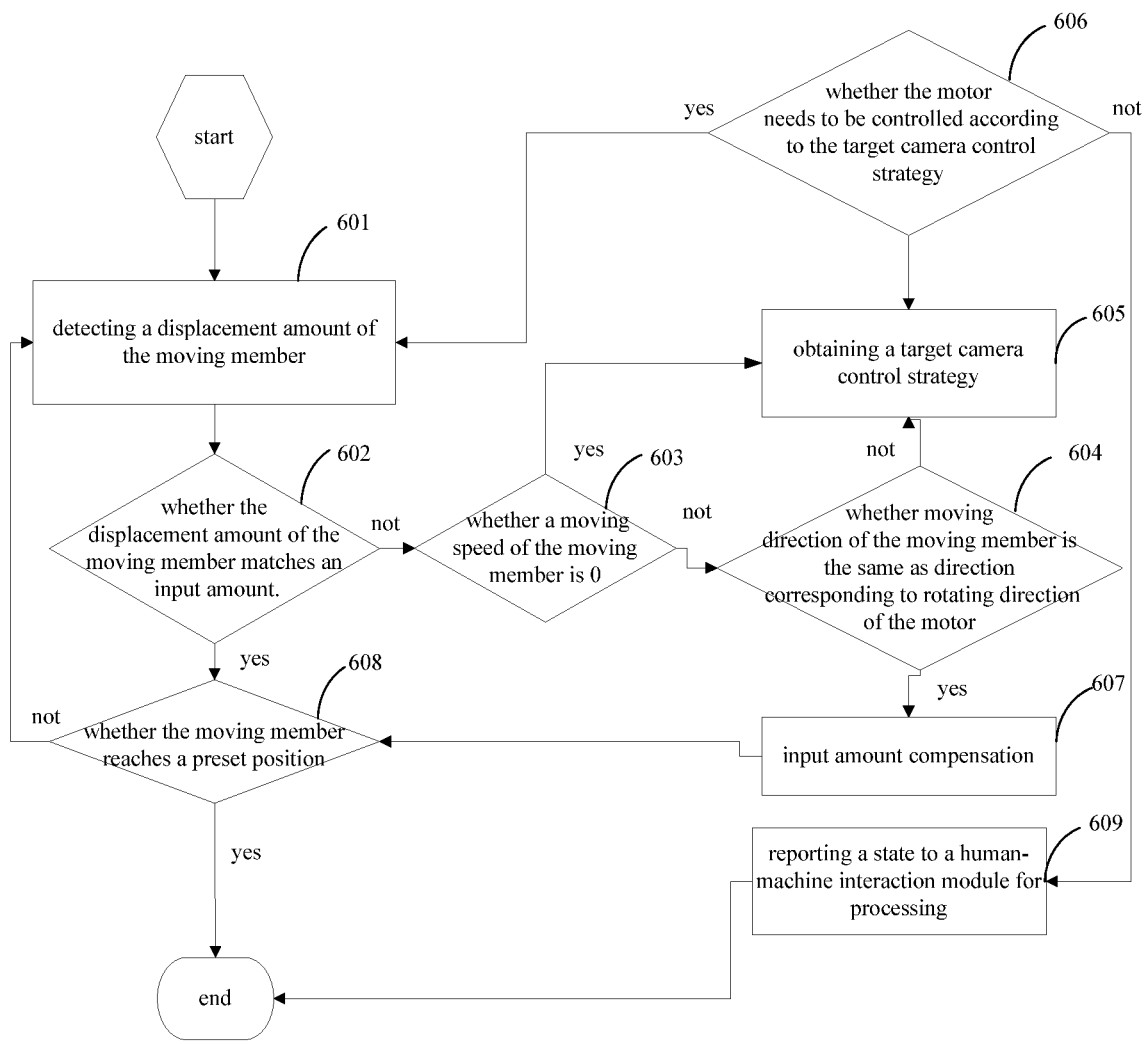
FIG. 6 is a flowchart of a camera control method according to still another embodiment of the present disclosure.

The embodiments of the present disclosure will be described hereinafter with reference to FIG. 3 and FIG. 6. Referring to FIG. 6, a camera control method of one embodiment of the present disclosure includes the following steps 601 to 609.

Step 601: detecting a displacement amount of the moving member.

In one embodiment of the present disclosure, the displacement amount of the moving member corresponds to a displacement amount of the camera in a one-to-one manner. Thus, the displacement amount of the camera may be represented by the displacement amount of the moving member.

Step 602: determining whether the displacement amount of the moving member matches an input amount.

In one embodiment of the present disclosure, the above input amount may refer to a control signal provided by the processor to the motor. Specifically, within the load range of the motor, there is a one-to-one correspondence between the control signal for controlling the motor and the displacement amount. Thus, the displacement amount of the moving member may be compared with a displacement amount corresponding to the input amount. If the displacement amount of the moving member is the same as the displacement amount corresponding to the input amount, or a difference between the displacement amount of the moving member and the displacement amount corresponding to the input amount is smaller than a preset difference, it may be determined that the displacement amount of the moving member matches the input amount, otherwise, it may be determined that the displacement amount of the moving member does not match the input amount.

Specifically, if the displacement amount of the moving member matches the input amount, step 608 is performed, otherwise, step 603 is performed.

Step 603: determining whether a moving speed of the moving member is 0.

Specifically, if the moving speed of the moving member is 0, step 605 is performed, otherwise, step 604 is performed.

In step 604: determining whether a moving direction of the moving member is the same as a direction corresponding to a rotating direction of the motor.

Specifically, when the moving direction of the moving member is the same as the direction corresponding to the rotating direction of the motor, step 607 may be performed, otherwise, step 605 may be performed.

Step 605: obtaining a target camera control strategy.

In one embodiment of the present disclosure, a plurality of camera control strategies may be stored in advance. For example, a first control strategy for a case where the moving speed of the moving parts is 0, and a second control strategy for a case where a moving direction of the moving member is different from a direction corresponding to a rotating direction of the motor, may be preset. The first control strategy may include: stopping the rotation of the motor when the number of times the moving speed of the moving member is 0 is greater than a preset threshold value, and controlling the motor to continue to rotate when the number of times the moving speed of the moving member is 0 is less than the preset threshold value. The second control strategy may include reporting a state to a human-machine interaction module for processing.

Step 606: determining whether the motor needs to be controlled according to the target camera control strategy.

For example, if the target camera control strategy is the first control strategy, it may be determined whether the number of times the moving speed of the moving member is 0 is greater than the preset threshold value. If the number of times the moving speed of the moving member is 0 is greater than the preset threshold value, the motor control may be stopped, and step 609 may be performed. Otherwise, the motor may be controlled to continue to rotate, and step 601 may be returned to be performed. If the target camera control strategy is the second control strategy, it may be directly determined that the motor does not need to be controlled, and step 609 may be performed.

Step 607: performing an input amount compensation.

In one embodiment of the present disclosure, when the moving direction of the moving member is the same as the direction corresponding to the rotating direction of the motor, input amount compensation may be performed for the camera, that is, a control signal is continuously input to the motor to drive the motor to continuously rotate according to the original rotating direction, thereby driving the camera to move.

Step 608: determining whether the moving member reaches a preset position.

Specifically, the preset position may be a position in which the camera is retracted back into the accommodating space, or may be a position in which the camera extends out of the accommodating space. Specifically, when the moving member reaches the preset position, the process may end; and when the moving member does not reach the preset position, the step 601 may be returned to be performed.

Step 609: reporting a state to a human-machine interaction module for processing.

Specifically, the above human-machine interaction module may be used for, but is not limited to, controlling extension-retraction of the camera. The controlling extension-retraction of the camera, includes, but not limited to:

in the mechanical structure of the retractable camera (i.e., the retractable camera assembly described above), the camera is originally in a retracted state; when a pressing operation is identified, a camera closed-loop control system can respond by activating the motor to eject the camera, and turning on the camera module to enter a shooting mode;

in the mechanical structure of the retractable camera, when the camera is originally in an extended state; when an external pressing operation is sensed, the camera closed-loop control system can control turning off the shooting mode and retracting the camera;

in the mechanical structure of the retractable camera, when the camera is in the process of being ejected, if it is sensed that external pressure causes the camera to move in the reverse direction, the control of extending the camera out can be stopped, the camera is retracted, and the user is reminded not to block the camera from extending out when the camera is needed;

in the mechanical structure of the retractable camera, when the camera is in the process of being retracted, if the motor is blocked by external force or foreign matters, the driving of the motor may be stopped to prevent the motor from operating all the time, and the user may be reminded to assist in retracting the camera back in place.

In one embodiment of the present disclosure, in the camera closed-loop control system (i.e., an application scenario of a displacement closed-loop control system), the function of the system to detect an output amount is taken as an input interface for human-machine interaction, thereby adding human-machine interaction function to the displacement closed-loop control system, and providing more human-machine interaction experiences without adding additional hardware costs.

Specifically, in one embodiment of the present disclosure, an elastic transmission mechanism (for example, a spring) is added to the input and output of the camera closed-loop control system to transmit the displacement amount, and the displacement amount generated by stress deformation thereof is applied to a forward output end of the camera closed-loop control system. A closed-loop detection mechanism reflects a displacement change of an output end, and an external pressure may be indirectly reflected through a displacement amount of the output end, thereby affecting the control of the camera closed-loop control system and achieving the purpose of increasing the human-machine interaction function in the same hardware environment.

In order to better describe the relationship between the parts, the external pressing is defined as a reverse input; the rotation of the motor is defined as a forward input; displacement of a carrier in which the camera is located is defined as a forward output; and, behavior of the camera control closed-loop system that differs from the forward output characteristic after detecting the reverse input is defined as a reverse output.

Specifically, the forward control process may be considered as a simple feature of the closed-loop control module; and the reverse control process includes feedback part of the camera closed-loop control system, which is also its own attribute. However, the function of the reverse control process in the human-machine interaction process is mainly emphasized here.

A camera closed-loop control system according to one embodiment of the present disclosure and a camera closed-loop control system in the related art are described hereinafter with reference to FIG. 7 and FIG. 8.

Figure 7:
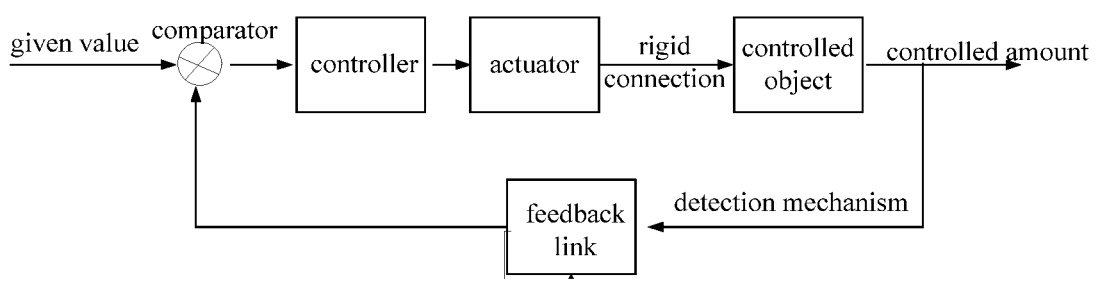
FIG. 7 is a schematic diagram of a camera closed-loop control system in the related art.

Referring to FIG. 7, in an existing camera closed-loop control system, a given value is a forward input amount as described above, and functions of the given value, a comparator and a controller are performed by a Central Processing Unit (CPU). An actuator is composed of a motor-driving structure, a motor (for example, a stepping motor), and a transmission structure. A controlled object refers to a camera carrier. A controlled amount refers to a displacement of the camera. A feedback link includes displacement detection (e.g., Hall detection) and CPU operation. Thus, it can be seen that the displacement control is only a simple displacement control, and after a given value is fixed, the system tends to a steady state, and a single forward input determines a final forward output result, i.e., a one-to-one relationship between a single input and a single output.

Figure 8:
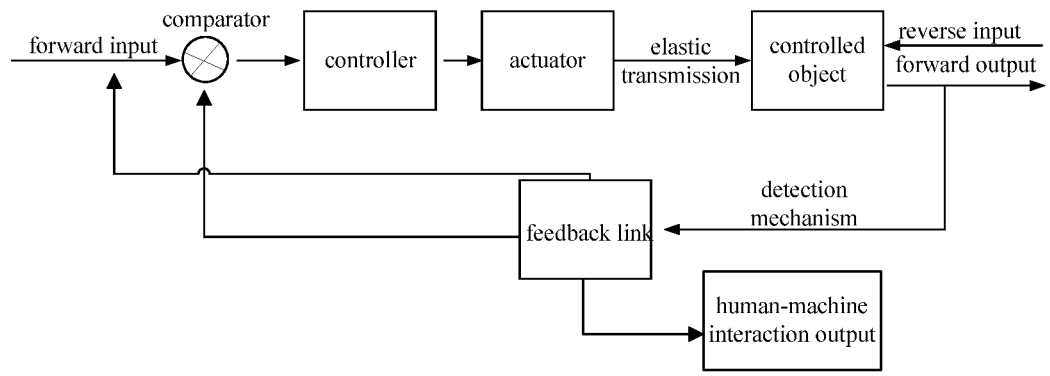
FIG. 8 is a schematic diagram of a camera closed-loop control system according to an embodiment of the present disclosure.

Referring to FIG. 8, in the camera closed-loop control system according to one embodiment of the present disclosure, since the elastic transmission is adopted, the controlled object is also displaced when an external pressure is increased, and the camera closed-loop control system can detect a change in the displacement. No matter whether the forward input terminal has input or no input, the size of external pressure can be identified through the displacement difference, thereby realizing the function of human-machine interaction.

Specifically, when the forward input is zero, the controlled object may be considered as a steady state, and when a negative feedback detects a change in displacement, it is determined that an external pressure is applied (i.e., there is a reverse input). When there is a forward input, the stepping motor itself may form a one-to-one correspondence with the displacement within the load range. When the stepping motor receives a command of the controller and executes, it is found that there is a significant deviation in displacement and it may be considered that there is a reverse input with an external force which causes the controlled object to significantly deviate from the control. At this time, the pressing of the external force may also be identified.

The situation that the stepping motor is blocked is different from the reverse pressing force. When the stepping motor is blocked, the controlled object is not controlled by the stepping motor but its displacement has not changed, thus the situation that the stepping motor is blocked is different from a situation that the displacement of the device is changed by applying external force. The process of pressing can also be identified. The camera closed-loop control system of the one embodiment of the present disclosure monitors two inputs by using one detection structure and achieves two or more outputs at the same time.

Figure 9:
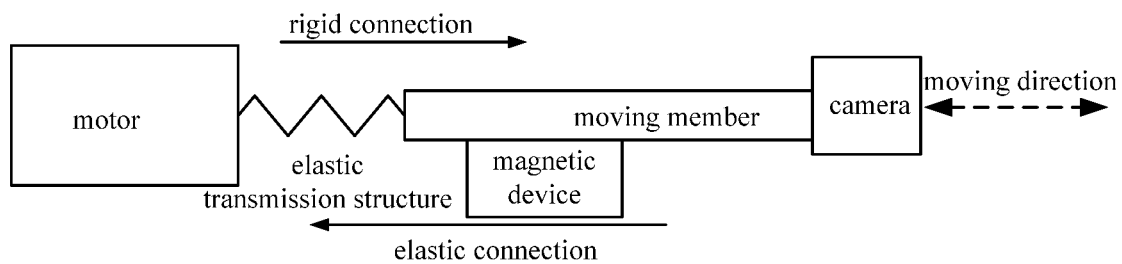
FIG. 9 is a schematic diagram showing connections of a camera connection according to an embodiment of the present disclosure.

The elastic transmission shown in FIG. 8 means that the elastic transmission structure itself has a certain preload amount, and the preload amount is greater than the driving force of the motor, so that the driving of the motor can fully act on the controlled object, equivalent to a rigid connection. However, with respect to a pressing force at the reverse input end, the elastic transmission structure will continue to be compressed on the basis of the preload amount, and equivalent characteristics of the mechanical structure in stress can be shown in FIG. 9.

The human-machine interaction shown in FIG. 8 includes, but is not limited to, controlling extension-retraction of the camera. The controlling extension-retraction of the camera, may include the following:

(a) in the mechanical structure of the retractable camera (i.e., the retractable camera assembly described above), the camera is originally in a retracted state; when a pressing operation is identified, a camera closed-loop control system can respond by activating the motor to eject the camera, and turning on the camera module to enter a shooting mode;

(b) in the mechanical structure of the retractable camera, when the camera is originally in an extended state; when an external pressing operation is sensed, the camera closed-loop control system can control turning off the shooting mode and retracting the camera;

(c) in the mechanical structure of the retractable camera, when the camera is in the process of being ejected, if it is sensed that external pressure causes the camera to move in the reverse direction, the control of extending the camera out can be stopped, the camera is retracted, and the user is reminded not to block the camera from extending out when the camera is needed;

(d) in the mechanical structure of the retractable camera, when the camera is in the process of being retracted, if the motor is blocked by external force or foreign matters, the driving of the motor may be stopped to prevent the motor from operating all the time, and the user may be reminded to assist in retracting the camera back in place.

The embodiments of the present disclosure can realize an external force (e.g., pressure) detection function by means of a displacement closed-loop system without adding additional sensors, provide more human-machine interaction modes without increasing hardware costs, provide a better user experience, and solve the problem of forming an opening for a front-facing camera in a full-screen terminal.

It will be appreciated that since the camera closed-loop control system is equivalent to an elastic transmission when an external force is applied, a power button may be placed behind the moving member. By pressing a top of the camera, the camera can transfer pressure to the power button, thereby achieving the function of pressing the camera to turn on and off the camera.

Figure 10:
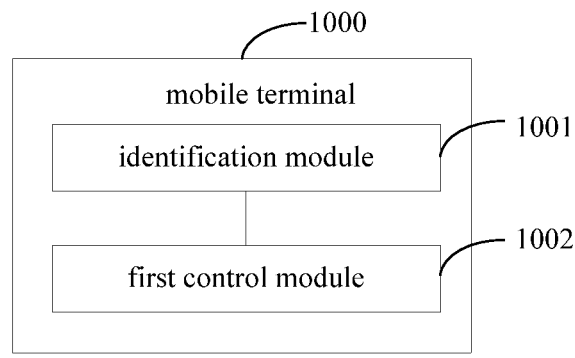
FIG. 10 is a schematic diagram of a mobile terminal according to an embodiment of the present disclosure.

Referring to FIG. 10, FIG. 10 is a schematic diagram of a mobile terminal according to an embodiment of the present disclosure. The mobile terminal is provided with an accommodating space for accommodating a retractable camera assembly. The retractable camera assembly includes a camera and a motor. The motor is connected to the camera via an elastic transmission structure for driving the camera to move. As shown in FIG. 10, the mobile terminal 1000 includes an identification module 1001 and a first control module 1002.

The identification module 1001 is used to, when a triggering operation against the camera is detected, identify a current state of the camera. The triggering operation includes a pressing operation or a stretching operation, and the state of the camera includes a retracted state, an extended state, a retracting process or an extending process.

The first control module 1002 is used to control movement of the camera according to the triggering operation and the current state of the camera.

Optionally, the first control module 1002 is specifically used to, when the triggering operation is a pressing operation and the current state of the camera is a retracted state, control the camera to move in a direction of extending out of the accommodating space;

when the triggering operation is the pressing operation and the current state of the camera is an extended state, control the camera to move in a direction of retracting back into the accommodating space;

when the triggering operation is the pressing operation and the current state of the camera is an extending process, control the camera to move in the direction of retracting back into the accommodating space;

when the triggering operation is a stretching operation and the current state of the camera is a retracting process, control the camera to move in the direction of extending out of the accommodating space.

Figure 11:
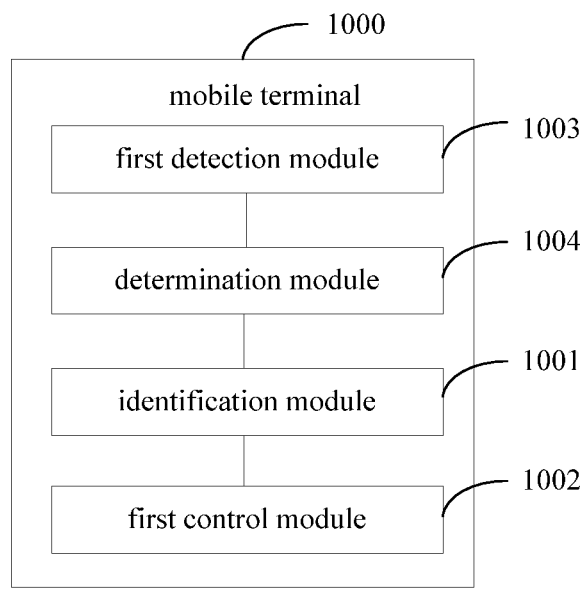
FIG. 11 is a schematic diagram of a mobile terminal according to another embodiment of the present disclosure.

Optionally, referring to FIG. 11, the mobile terminal 1000 further includes:

a first detection module 1003 used to, before the identifying a current state of the camera when a triggering operation against the camera is detected, detect a displacement amount of the camera;

a determination module 1004 used to determine that there is a triggering operation against the camera when the displacement amount of the camera does not match a displacement amount corresponding to a control signal of the motor.

Figure 12:
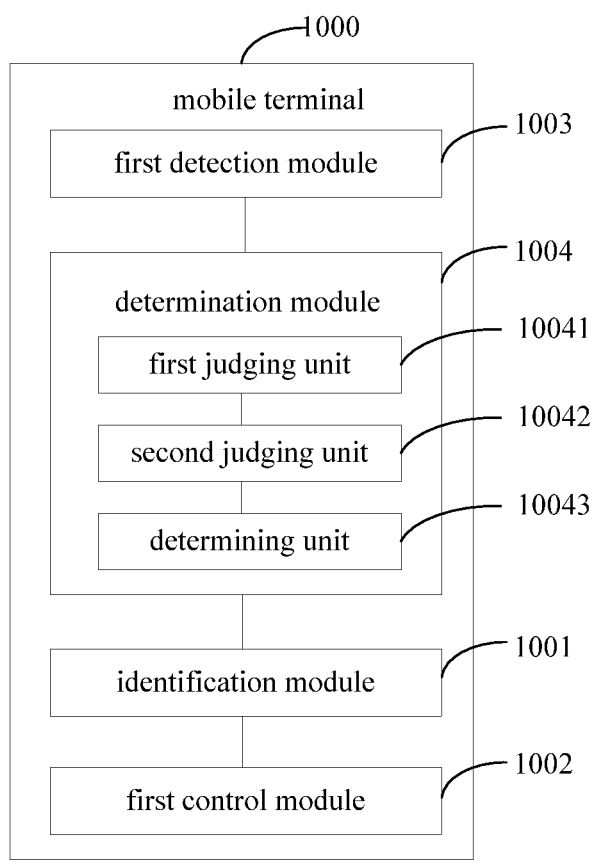
FIG. 12 is a schematic diagram of a mobile terminal according to still another embodiment of the present disclosure.

Optionally, referring to FIG. 12, the determination module 1004 includes:

a first judging unit 10041 used to, when the displacement amount of the camera does not match the displacement amount corresponding to the control signal of the motor, determine whether a moving speed of the camera is 0;

a second judging unit 10042 used to, when the moving speed of the camera is not 0, determine whether a moving direction of the camera is the same as a moving direction corresponding to a target rotating direction of the motor;

a determining unit 10043 used to, when the moving direction of the camera is different from the moving direction corresponding to the target rotating direction of the motor, determine that there is a triggering operation against the camera.

Optionally, the determination unit 10043 is specifically used to:

when the moving direction corresponding to the rotating direction of the motor is the direction of extending out of the accommodating space, if the moving direction of the camera is different from the moving direction corresponding to the target rotating direction of the motor, determine that there is a pressing operation for the camera;

when the moving direction corresponding to the rotating direction of the motor is the direction of retracting back into the accommodating space, if the moving direction of the camera is different from the moving direction corresponding to the target rotating direction of the motor, determine that there is a stretching operation for the camera.

Figure 13:
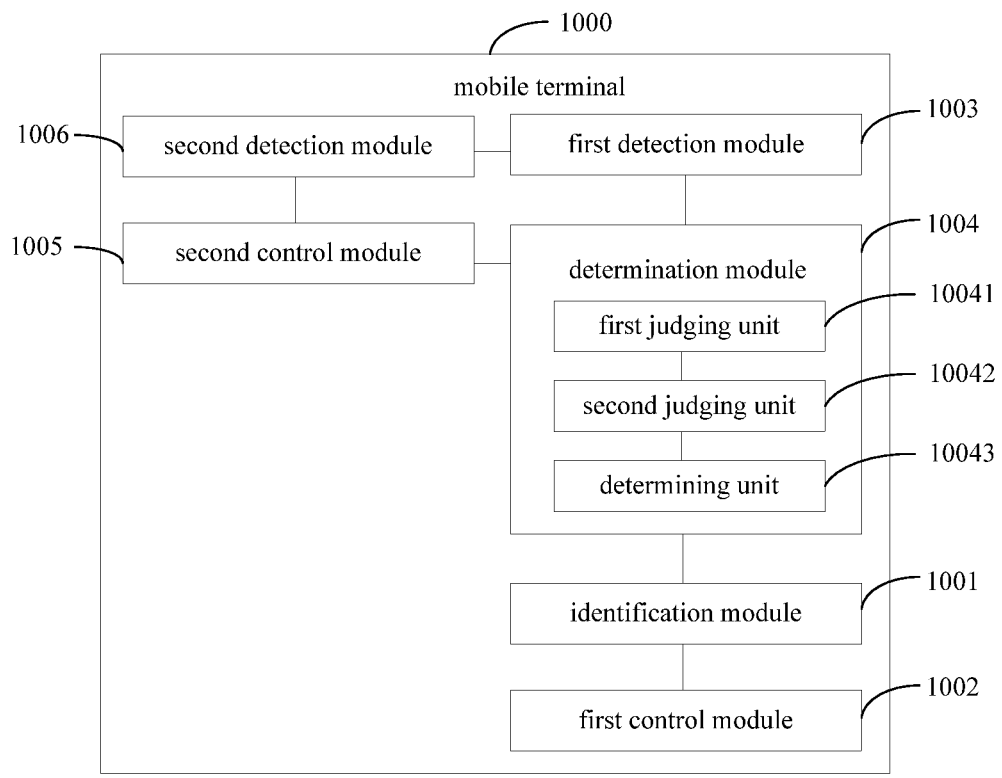
FIG. 13 is a schematic diagram of a mobile terminal according to yet another embodiment of the present disclosure.

Optionally, referring to FIG. 13, the mobile terminal 1000 further includes:

a second control module 1005 used to, when the moving direction of the camera is the same as the moving direction corresponding to the target rotating direction of the motor, control the motor to continue to rotate in the target rotating direction so as to drive the camera to move;

a second detection module 1006 used to detect whether the camera moves to a preset position.

The first detection module 1003 is further used to, when the camera is not moved to the preset position, detect the displacement amount of the camera.

Figure 14:
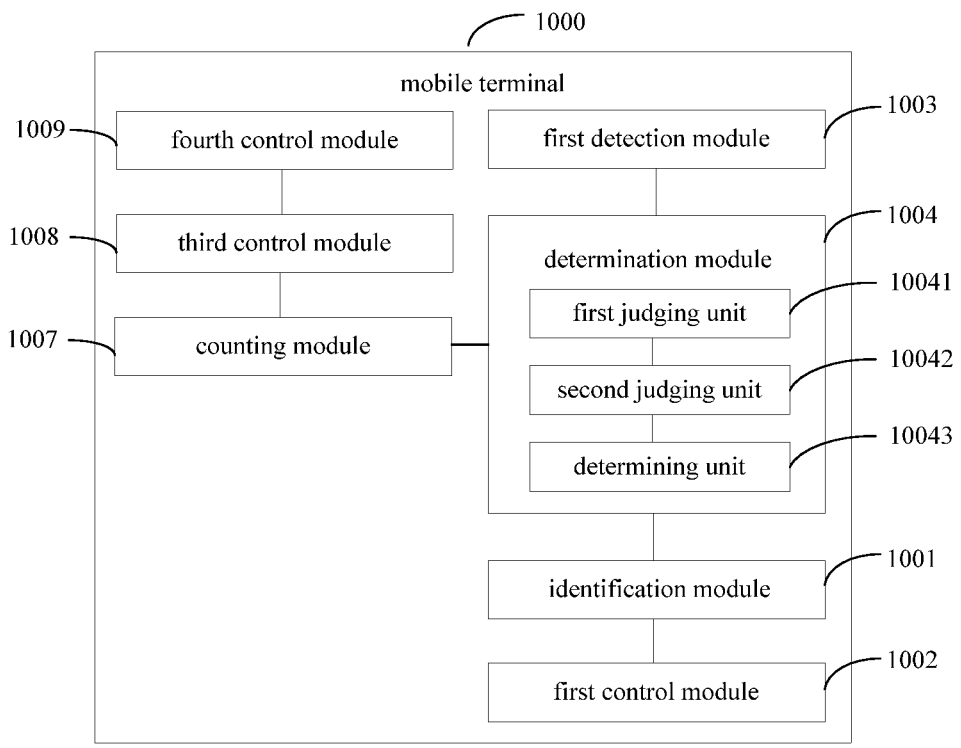
FIG. 14 is a schematic diagram of a mobile terminal according to still yet another embodiment of the present disclosure.

Optionally, referring to FIG. 14, the mobile terminal 1000 further includes:

a counting module 1007 used to, increase the number of times the moving speed of the camera is 0 by 1 if the moving speed of the camera is 0;

a third control module 1008 used to, when the number of times the moving speed of the camera is 0 is greater than a preset threshold value, control the motor to stop rotating, clear the number of times the moving speed of the camera is 0 and output prompt information;

a fourth control module 1009 used to, when the number of times the moving speed of the camera is 0 is not greater than the preset threshold value, control the motor to continue to rotate in the target rotating direction, and detect the displacement amount of the camera.

The mobile terminal 1000 provided in the embodiments of the present disclosure is capable of implementing various processes implemented by the mobile terminal in the method embodiments of FIG. 4 to FIG. 6. To avoid repetition, details are not described herein.

In the mobile terminal 1000 according to one embodiment of the present disclosure, the identification module 1001 is used to, when a triggering operation against the camera is detected, identify a current state of the camera. The triggering operation includes a pressing operation or a stretching operation, and the state of the camera includes a retracted state, an extended state, a retracting process or an extending process. The first control module 1002 is used to control movement of the camera according to the triggering operation and the current state of the camera. The movement of the camera can be controlled according to the triggering operation of the user against the camera and the current state of the camera, thereby enriching the control mode of the camera of the retractable camera assembly and increasing the interaction mode between the user and the camera.

Figure 15:
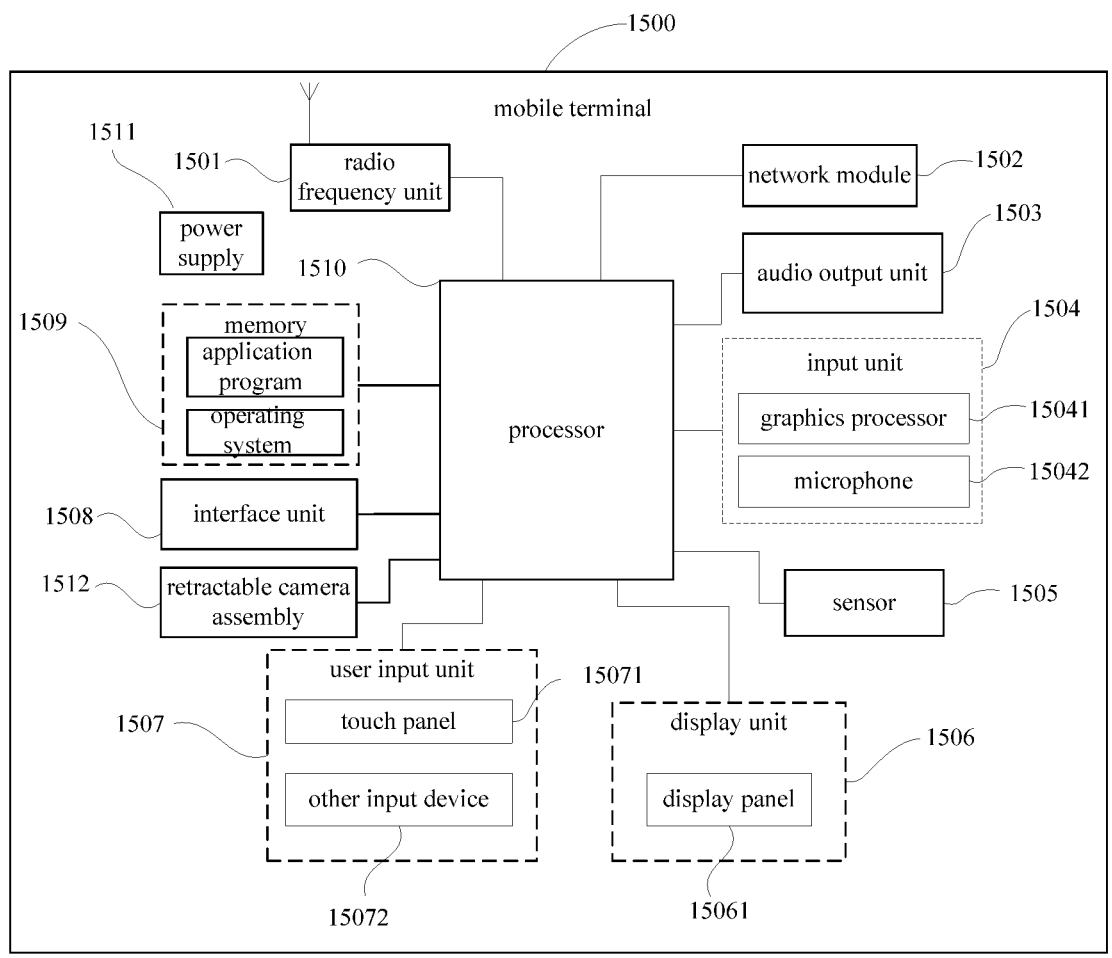
FIG. 15 is a schematic diagram of a hardware structure of a mobile terminal for implementing various embodiments of the present disclosure.

FIG. 15 is a schematic diagram of a hardware structure of a mobile terminal for implementing various embodiments of the present disclosure. Referring to FIG. 15, the mobile terminal 1500 includes, but is not limited to, a radio frequency unit 1501, a network module 1502, an audio output unit 1503, an input unit 1504, a sensor 1505, a display unit 1506, a user input unit 1507, an interface unit 1508, a memory 1509, a processor 1510, a power supply 1511, and a retractable camera assembly 1512. It will be appreciated by those skilled in the art that structures of the mobile terminal shown in FIG. 15 do not constitute a definition of a mobile terminal, which may include more or fewer components than illustrated, or have some components combined, or different component arrangements. In one embodiment of the present disclosure, the mobile terminal includes, but is not limited to, a mobile phone, a tablet computer, a notebook computer, a palmtop computer, an in-vehicle terminal, a wearable device, a pedometer, and the like.

The processor 1510 is used to, when a triggering operation against the camera is detected, identify a current state of the camera. The triggering operation includes a pressing operation or a stretching operation, and the state of the camera includes a retracted state, an extended state, a retracting process or an extending process.

This embodiment of the present disclosure can control the movement of the camera according to the triggering operation of the user against the camera and the target state in which the camera is currently located, thereby enriching the control mode of the camera of the retractable camera assembly and increasing the interaction mode between the user and the camera.

Optionally, the processor 1510 is further used to, when the triggering operation is a pressing operation and the current state of the camera is a retracted state, control the camera to move in a direction of extending out the accommodating space;

when the triggering operation is the pressing operation and the current state of the camera is an extended state, control the camera to move in a direction of retracting back into the accommodating space;

when the triggering operation is the pressing operation and the current state of the camera is an extending process, control the camera to move in the direction of retracting back into the accommodating space;

when the triggering operation is a stretching operation and the current state of the camera is a retracting process, control the camera to move in the direction of extending out the accommodating space.

Optionally, the processor 1510 is further used to, before the identifying a current state of the camera when a triggering operation against the camera is detected, detect a displacement amount of the camera;

determine that there is a triggering operation against the camera when the displacement amount of the camera does not match a displacement amount corresponding to a control signal of the motor.

Optionally, the processor 1510 is further used to, when the displacement amount of the camera does not match the displacement amount corresponding to the control signal of the motor, determine whether a moving speed of the camera is 0;

when the moving speed of the camera is not 0, determine whether a moving direction of the camera is the same as a moving direction corresponding to a target rotating direction of the motor;

when the moving direction of the camera is different from the moving direction corresponding to the target rotating direction of the motor, determine that there is a triggering operation against the camera.

Optionally, the processor 1510 is further used to, when the moving direction corresponding to the rotating direction of the motor is the direction of extending out of the accommodating space, if the moving direction of the camera is different from the moving direction corresponding to the target rotating direction of the motor, determine that there is a pressing operation for the camera;

when the moving direction corresponding to the rotating direction of the motor is the direction of retracting back into the accommodating space, if the moving direction of the camera is different from the moving direction corresponding to the target rotating direction of the motor, determine that there is a stretching operation for the camera.

Optionally, the processor 1510 is further used to, when the moving direction of the camera is the same as the moving direction corresponding to the target rotating direction of the motor, control the motor to continue to rotate in the target rotating direction so as to drive the camera to move;

detect whether the camera moves to a preset position.

when the camera is not moved to the preset position, return to perform the step of detecting the displacement amount of the camera.

Optionally, the processor 1510 is further used to, increase the number of times the moving speed of the camera is 0 by 1 if the moving speed of the camera is 0;

when the number of times the moving speed of the camera is 0 is greater than a preset threshold value, control the motor to stop rotating, clear the number of times the moving speed of the camera is 0 and output prompt information;

when the number of times the moving speed of the camera is 0 is not greater than the preset threshold value, control the motor to continue to rotate in the target rotating direction, and return to perform the step of detecting the displacement amount of the camera.

It should be understood that in this embodiment of the present disclosure, the radio frequency unit 1501 may be used to receive and transmit signals during receiving and transmitting information or a call. Specifically, the radio frequency unit 1501 receives downlink data from a base station and then transmits the downlink data to the processor 1510 for processing. Uplink data is transmitted to the base station. Generally, the radio frequency unit 1501 includes, but is not limited to, an antenna, at least one amplifier, a transceiver, a coupler, a low noise amplifier, a duplexer, and the like. In addition, the radio frequency unit 1501 may also communicate with the network and other devices through a wireless communication system.

The mobile terminal provides wireless broadband Internet access to the user through the network module 1502, such as assisting the user in receiving and transmitting email, browsing web pages, and accessing streaming media.

The audio output unit 1503 may convert the audio data received by the radio frequency unit 1501 or the network module 1502 or stored in the memory 1509 into an audio signal and output as sound. Moreover, the audio output unit 1503 may also provide audio output (e.g., call signal reception sound, message reception sound, etc.) related to a specific function performed by the mobile terminal 1500. The audio output unit 1503 includes a speaker, a buzzer, a receiver, and the like.

The input unit 1504 is used for receiving an audio or video signal. The input unit 1504 may include a Graphics Processing Unit (GPU) 15041 and a microphone 15042. The GPU 15041 processes image data of static pictures or videos obtained by an image capturing apparatus (such as a camera) in a video capturing mode or an image capturing mode. The processed image frame may be displayed on the display unit 1506. The image frames processed by the graphics processor 15041 may be stored in the memory 1509 (or other storage medium) or transmitted via the radio frequency unit 1501 or the network module 1502. The microphone 15042 can receive sound and can process such sound into audio data. The processed audio data may be converted into a format output that may be transmitted to the mobile communication base station via the radio frequency unit 1501 in the case of a telephone talk mode.

The mobile terminal 1500 further includes at least one sensor 1505, such as a light sensor, a motion sensor, and other sensors. Specifically, the light sensor includes an ambient light sensor and a proximity sensor. The ambient light sensor can adjust brightness of a display panel 15061 according to the brightness of the ambient light. The proximity sensor can turn off the display panel 15061 and/or backlight when the mobile terminal 1500 moves to the ear. As one of the motion sensors, an accelerometer sensor can detect the magnitude of the acceleration in each direction (generally three axes), can detect the magnitude and direction of the gravity when stationary, and can be used to identify the attitude of the mobile terminal (such as horizontal/vertical screen switching, related games, magnetometer attitude calibration), vibration identification related functions (such as pedometer, knocking), and the like. The sensor 1505 may further include a fingerprint sensor, a pressure sensor, an iris sensor, a molecular sensor, a gyroscope, a barometer, a hygrometer, a thermometer, an infrared sensor, and the like, which will not be elaborated herein.

The display unit 1506 is used to display information input by or provided to the user. The display unit 1506 may include a display panel 15061, which may be configured in the form of a Liquid Crystal Display (LCD), an Organic Light-Emitting Diode (OLED), or the like.

The user input unit 1507 may be used to receive the input number or character information, and to generate a key signal input related to the user setting and the function control of the mobile terminal. Specifically, the user input unit 1507 includes a touch panel 15071 and other input devices 15072. The touch panel 15071, also referred to as a touch screen, may collect touch operations on or near the touch panel (e.g., operations on or near the touch panel 15071 using any suitable object or accessory, such as a finger, stylus, or the like). The touch panel 15071 may include a touch detection device and a touch controller. The touch detection device detects a touch orientation of the user, detects a signal generated by the touch operation, and transmits the signal to the touch controller. The touch controller receives touch information from the touch detection device and converts it into contact coordinates, which are then transmitted to the processor 1510, receives commands from the processor 1510 and execute them. In addition, the touch panel 15071 may be implemented in various types such as a resistive type, a capacitive type, an infrared ray, and a surface acoustic wave. In addition to the touch panel 15071, the user input unit 1507 may further include other input devices 15072. Specifically, other input devices 15072 may include, but are not limited to, a physical keyboard, a function key (such as a volume control key, an on-off key), a trackball, a mouse, and a joystick, which will not be elaborated herein.

Further, the touch panel 15071 may be overlaid on the display panel 15061. When the touch panel 15071 detects a touch operation on or near the touch panel, the touch panel 15071 transmits it to the processor 1510 to determine a type of a touch event. Then, the processor 1510 provides a corresponding visual output on the display panel 15061 according to the type of the touch event. Although in FIG. 15, the touch panel 15071 and the display panel 15061 are implemented as two separate components to implement the input and output functions of the mobile terminal, in some embodiments, the touch panel 15071 and the display panel 15061 may be integrated to implement the input and output functions of the mobile terminal, which are not specifically limited herein.

The interface unit 1508 is an interface through which an external device is connected to the mobile terminal 1500. For example, the external device may include a wired or wireless headset port, an external power (or battery charger) port, a wired or wireless data port, a memory card port, a port for connecting a device having an identification module, an audio input/output (I/O) port, a video I/O port, a headset port, and the like. The interface unit 1508 may be used to receive input (e.g., data information, power, etc.) from the external device and transmit the received input to one or more elements within the mobile terminal 1500 or may be used to transmit data between the mobile terminal 1500 and the external device.

The memory 1509 may be used to store software programs and various data. The memory 1509 may mainly include a program storage area and a data storage area. The program storage area may store an operating system, an application program (such as a sound play function, an image play function) required by at least one function, and the like. The data storage area may store data (such as audio data, a phone book) created according to use of the mobile terminal. In addition, the memory 1509 may include high speed random access memory, and may also include non-volatile memory, such as at least one magnetic disk storage device, flash memory device, or other volatile solid state storage device.

The processor 1510 is a control center of the mobile terminal, connects various parts of the entire mobile terminal by various interfaces and lines, executes various functions of the mobile terminal and processes data by running or executing software programs and/or modules stored in the memory 1509 and invoking data stored in the memory 1509, thereby performing overall monitoring of the mobile terminal. The processor 1510 may include one or more processing units. Optionally, the processor 1510 may integrate an application processor and a modem processor. The application processor primarily processes the operating system, the user interface and the application program. The modem processor primarily processes wireless communications. It will be appreciated that the modem processor may also not be integrated into the processor 1510.

The mobile terminal 1500 may further include a power source 1511 (such as a battery) that supplies power to the various components. Optionally, the power source 1511 may be logically connected to the processor 1510 through a power management system to perform functions such as managing charging, discharging, and power consumption management through the power management system.

In addition, the mobile terminal 1500 includes functional modules not shown, which will not be elaborated herein.

Optionally, one embodiment of the present disclosure further provides a mobile terminal including a processor 1510, a memory 1509, and a computer program stored in the memory 1509 and executable on the processor 1510. When the computer program is executed by the processor 1510, each of the processes in the camera control method embodiment is implemented, and the same technical effect can be achieved. To avoid repetition, details are not described herein.

One embodiment of the present disclosure further provides a computer readable storage medium including a computer program stored thereon. The computer program is executed by a processor to implement each process of the above camera control method embodiment, and the same technical effect can be achieved. To avoid repetition, details are not described herein. The computer-readable storage medium includes, for example, a Read-Only Memory (ROM), a Random Access Memory (RAM), a magnetic disk, or an optical disk.

It is to be noted that terms "comprise", "include" or any other variations are intended to encompass a non-exclusive inclusion, such that a process, method, system, commodity, or device that include a series of steps or elements include not only those steps or elements but also other steps or elements that are not explicitly listed, or steps or elements that are inherent to such process, method, commodity, or device. An element defined by the phrase "comprising a . . . " does not exclude the presence of additional equivalent elements in the process, method, commodity, or device including the element.

From the above description of the embodiments, it will be apparent to those skilled in the art that the method of the above embodiments may be implemented by means of software plus the necessary general hardware platform, but may be implemented by means of hardware, but in many cases the former is the preferred embodiment. Based on such an understanding, the technical solution of the present disclosure, in essence or in part contributing to the related art, may be embodied in the form of a software product stored in a storage medium (such as a ROM/RAM, a magnetic disk, or an optical disk) including instructions for causing a terminal (which may be a mobile phone, a computer, a server, an air conditioner, or a network device) to perform the methods described in the various embodiments of the present disclosure.

The embodiments of the present disclosure have been described above in conjunction with the accompanying drawings, but the present disclosure is not limited to the specific embodiments described above. The specific embodiments described above are merely illustrative and not restrictive, and those of ordinary skill in the art will be able to make many forms without departing from the spirit of the disclosure and the scope of the claims, all of which fall within the protection of the disclosure.

What is claimed is:

1. A camera control method applied to a mobile terminal, wherein the mobile terminal comprises an accommodating space for accommodating a retractable camera assembly, the retractable camera assembly comprises a camera and a motor, the motor is connected to the camera via an elastic transmission structure for driving the camera to move; wherein the method comprises:
   identifying a current state of the camera when a triggering operation against the camera is detected; wherein the triggering operation comprises a pressing operation or a stretching operation, and the state of the camera comprises a retracted state, an extended state, a retracting process or an extending process;
   controlling movement of the camera according to the triggering operation and the current state of the camera.

2. The method according to claim 1, wherein the controlling movement of the camera according to the triggering operation and the current state of the camera, comprises:
   when the triggering operation is a pressing operation and the current state of the camera is the retracted state, controlling the camera to move in a direction of extending out of the accommodating space;
   when the triggering operation is the pressing operation and the current state of the camera is the extended state, controlling the camera to move in a direction of retracting back into the accommodating space;
   when the triggering operation is the pressing operation and the current state of the camera is the extending process, controlling the camera to move in the direction of retracting back into the accommodating space;
   when the triggering operation is a stretching operation and the current state of the camera is the retracting process, controlling the camera to move in the direction of extending out of the accommodating space.

3. The method according to claim 1, wherein before the identifying a current state of the camera when a triggering operation against the camera is detected, the method further comprises:
   detecting a displacement amount of the camera;
   determining that there is a triggering operation against the camera when the displacement amount of the camera does not match a displacement amount corresponding to a control signal of the motor.

4. The method according to claim 3, wherein the determining that there is a triggering operation against the camera when the displacement amount of the camera does not match a displacement amount corresponding to a control signal of the motor, comprises:
   determining whether a moving speed of the camera is 0, when the displacement amount of the camera does not match the displacement amount corresponding to the control signal of the motor;
   determining whether a moving direction of the camera is the same as a moving direction corresponding to a target rotating direction of the motor when the moving speed of the camera is not 0,
   determining that there is a triggering operation against the camera when the moving direction of the camera is different from the moving direction corresponding to the target rotating direction of the motor.

5. The method according to claim 4, wherein the determining that there is a triggering operation against the camera when the moving direction of the camera is different from the moving direction corresponding to the target rotating direction of the motor, comprises:
   when the moving direction corresponding to the rotating direction of the motor is a direction of extending out of the accommodating space, if the moving direction of the camera is different from the moving direction corresponding to the target rotating direction of the motor, determining that there is a pressing operation for the camera;
   when the moving direction corresponding to the rotating direction of the motor is a direction of retracting back into the accommodating space, if the moving direction of the camera is different from the moving direction corresponding to the target rotating direction of the motor, determining that there is a stretching operation for the camera.

6. The method according to claim 4, wherein the method further comprises:
   when the moving direction of the camera is the same as the moving direction corresponding to the target rotating direction of the motor, controlling the motor to continue to rotate in the target rotating direction so as to drive the camera to move;
   detecting whether the camera moves to a preset position;
   when the camera is not moved to the preset position, retuning to perform the step of detecting the displacement amount of the camera.

7. The method according to claim 4, wherein the method further comprises:
   increasing the number of times the moving speed of the camera is 0 by 1 if the moving speed of the camera is 0;
   when the number of times the moving speed of the camera is 0 is greater than a preset threshold value, controlling the motor to stop rotating, clearing the number of times the moving speed of the camera is 0 and outputting prompt information;

when the number of times the moving speed of the camera is 0 is not greater than the preset threshold value, controlling the motor to continue to rotate in the target rotating direction, and retuning to perform the step of detecting the displacement amount of the camera.

8. A non-transitory computer-readable storage medium comprising a program stored thereon; wherein the program is executed by a processor to implement steps of the camera control method according to claim 1.

9. A mobile terminal comprising:
an accommodating space;
a retractable camera assembly accommodated in the accommodating space; wherein the retractable camera assembly comprises a camera and a motor, the motor is connected to the camera via an elastic transmission structure for driving the camera to move;
wherein the mobile terminal further comprises: a processor, a memory, and a program stored on the memory and executable on the processor, wherein the program is executed by the processor to,
when a triggering operation against the camera is detected, identify a current state of the camera; wherein the triggering operation comprises a pressing operation or a stretching operation, and the state of the camera comprises a retracted state, an extended state, a retracting process or an extending process;
control movement of the camera according to the triggering operation and the current state of the camera.

10. The mobile terminal according to claim 9, wherein the program is executed by the processor to,
when the triggering operation is a pressing operation and the current state of the camera is the retracted state, control the camera to move in a direction of extending out of the accommodating space;
when the triggering operation is the pressing operation and the current state of the camera is the extended state, control the camera to move in a direction of retracting back into the accommodating space;
when the triggering operation is the pressing operation and the current state of the camera is the extending process, control the camera to move in the direction of retracting back into the accommodating space;
when the triggering operation is a stretching operation and the current state of the camera is the retracting process, control the camera to move in the direction of extending out of the accommodating space.

11. The mobile terminal according to claim 9, wherein the program is executed by the processor to,
before identifying the current state of the camera when the triggering operation against the camera is detected, detect a displacement amount of the camera;
determine that there is a triggering operation against the camera when the displacement amount of the camera does not match a displacement amount corresponding to a control signal of the motor.

12. The mobile terminal according to claim 11, wherein the program is executed by the processor to,
when the displacement amount of the camera does not match the displacement amount corresponding to the control signal of the motor, determine whether a moving speed of the camera is 0;
when the moving speed of the camera is not 0, determine whether a moving direction of the camera is the same as a moving direction corresponding to a target rotating direction of the motor;
when the moving direction of the camera is different from the moving direction corresponding to the target rotating direction of the motor, determine that there is a triggering operation against the camera.

13. The mobile terminal according to claim 12, wherein the program is executed by the processor to,
when the moving direction corresponding to the rotating direction of the motor is a direction of extending out of the accommodating space, if the moving direction of the camera is different from the moving direction corresponding to the target rotating direction of the motor, determine that there is a pressing operation for the camera;
when the moving direction corresponding to the rotating direction of the motor is a direction of retracting back into the accommodating space, if the moving direction of the camera is different from the moving direction corresponding to the target rotating direction of the motor, determine that there is a stretching operation for the camera.

14. The mobile terminal according to claim 12, wherein the program is executed by the processor to,
when the moving direction of the camera is the same as the moving direction corresponding to the target rotating direction of the motor, control the motor to continue to rotate in the target rotating direction so as to drive the camera to move;
detect whether the camera moves to a preset position;
when the camera is not moved to the preset position, detect the displacement amount of the camera.

15. The mobile terminal according to claim 12, wherein the program is executed by the processor to,
increase the number of times the moving speed of the camera is 0 by 1 if the moving speed of the camera is 0;
when the number of times the moving speed of the camera is 0 is greater than a preset threshold value, control the motor to stop rotating, clear the number of times the moving speed of the camera is 0 and output prompt information;
when the number of times the moving speed of the camera is 0 is not greater than the preset threshold value, control the motor to continue to rotate in the target rotating direction, and detect the displacement amount of the camera.

* * * * *